Jan. 10, 1956
N. P. PEET
2,730,508
COOLING OF FINELY DIVIDED SOLIDS TO PREVENT
AFTERBURNING IN A REGENERATION LANE
Filed Nov. 29, 1951
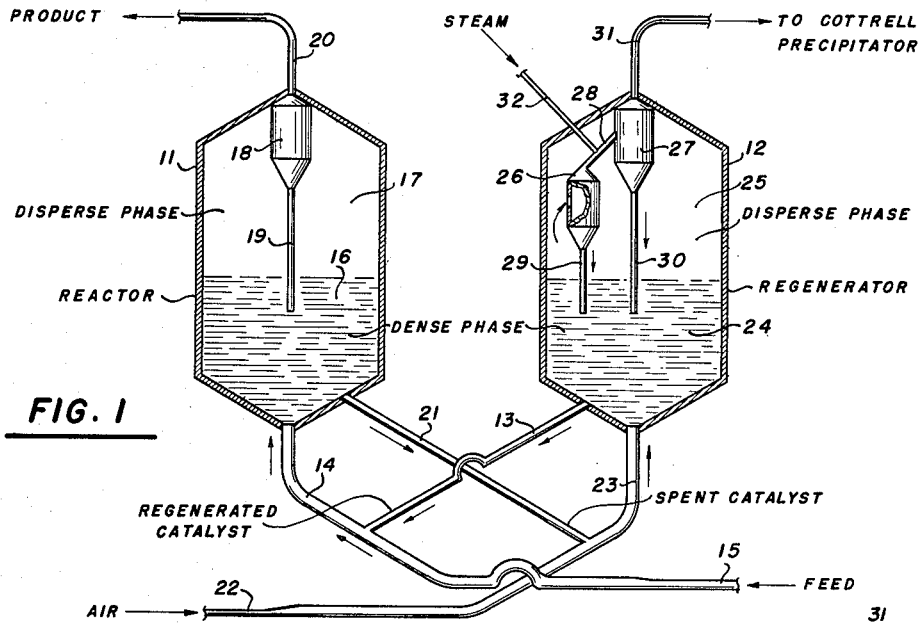
FIG. 1
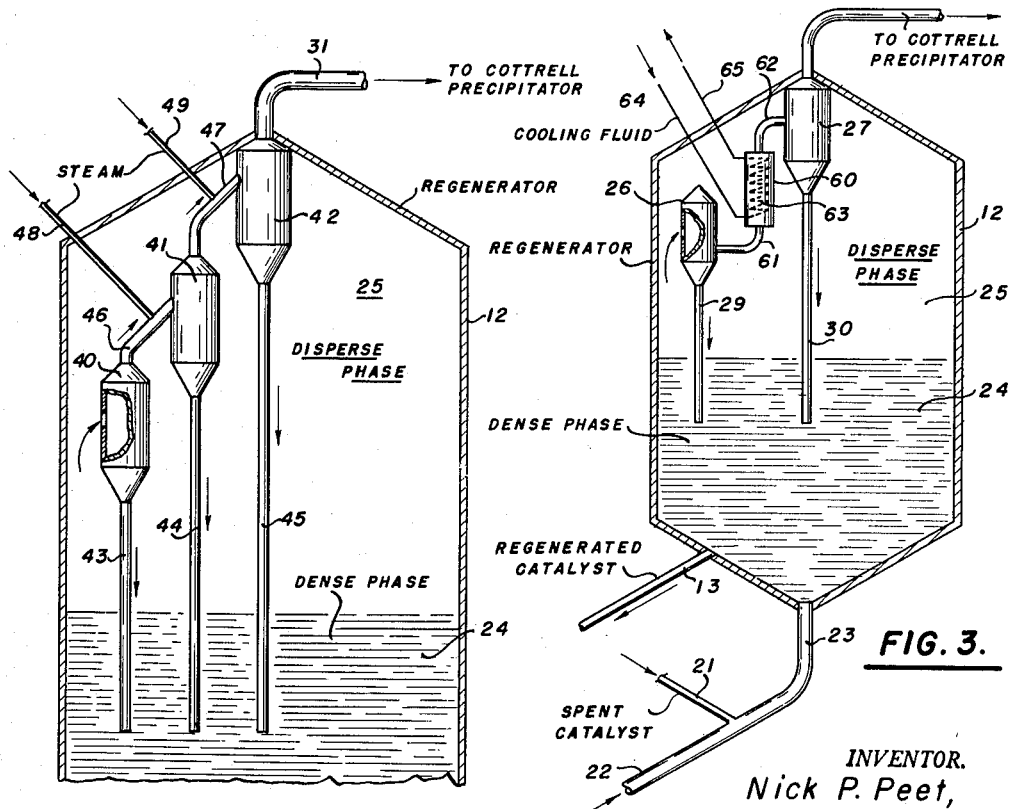
FIG. 2.
FIG. 3.
INVENTOR.
Nick P. Peet,
BY
AGENT.

United States Patent Office 2,730,508
Patented Jan. 10, 1956

2,730,508

COOLING OF FINELY DIVIDED SOLIDS TO PREVENT AFTERBURNING IN A REGENERATION LANE

Nick P. Peet, Baytown, Tex., assignor, by mesne assignments, to Esso Research and Engineering Company, Elizabeth, N. J., a corporation of Delaware Application November 29, 1951, Serial No. 258,902

5 Claims. (Cl. 252—417)

The present invention is directed to a method and apparatus for cooling gases and finely divided solids in a gaseous suspension. More particularly, the invention is directed to a method for preventing afterburning in a suspension of finely divided solids in a combustible gas.

The present invention may be briefly described as involving the cooling of a suspension of finely divided solids in a combustible regeneration gas at an elevated temperature in which the gas is caused to flow into at least two serially connected separation stages to cause separation between the finely divided solids and the combustible regeneration gases, the particular feature of the present invention being to cool the gases between the separation stages. By cooling the gases between the separation stages it is possible to prevent afterburning of the combustible gases and to allow the obtaining of substantial benefits.

In catalytic cracking and other catalytic operations, it is common practice to regenerate the catalyst, which may be finely divided silica-alumina, silica-magnesia or silica-zirconia. The regeneration is carried out by suspending the catalyst, which may be contaminated with carbon and carbonaceous bodies, in a stream of oxygen-containing gas which supports a combustion operation in a dense phase in a regeneration zone. By virtue of the combustion operation the carbon and carbonaceous bodies are consumed and a suspension of finely divided catalyst particles is formed in the regeneration gases. The regeneration gases themselves are combustible since they comprise a substantial quantity of carbon monoxide. The problem of afterburning exists in that, when the separation zones employed in such regeneration operations reduce the amount of catalyst in the suspension, a secondary burning occurs which is referred to as afterburning. Efforts have been made to reduce afterburning by cooling in the regeneration zone and particularly in the dispersed phase by injecting water into the dispersed phase. This operation has not been completely satisfactory since it results in removing a considerable amount of heat from the catalyst entrained to the primary cyclone. Therefore, in accordance with the present invention the suspension of catalyst in the separation zones is cooled between stages to prevent such afterburning and at the same time avoid cooling the major part of the catalyst entrained to the cyclones.

The cooling operation may be conducted in any one of a number of ways. For example, it is common practice to employ cyclone separators in the regeneration vessels near the top thereof. The size and capacity of the separators and the regeneration vessels is such that heat transfer means may be interposed between the cyclone separators. Preferably, however, cooling is obtained by injecting between stages a cooling fluid at a temperature below the temperature of the suspension of finely divided solids in the regeneration gases. For example, cooling may be obtained by injecting steam at a temperature lower than the temperature of the regeneration gases or other inert gases, such as flue gas or carbon dioxide, nitrogen and the like. Cooling may also be obtained by atomizing water and injecting it between stages. It is preferred to employ as a cooling medium steam since water vapor has a high specific heat and will allow the cooling to be performed efficiently. However, it is within the purview of my invention to use other inert fluids and even flue gas recovered from the Cottrell precipitators downstream from the cyclone separators may be used as a cooling medium provided the temperature of the flue gas is properly reduced.

The catalyst employed in operations in accordance with the present invention will be of the type mentioned before and will have particle diameters ranging from less than 1 micron up to about 200 microns with the greater proportion of the catalyst having particle diameters in the range from about 20 to 80 microns. In the cyclone separators the great mass of catalyst is removed from the regeneration gases and only the catalyst fines having particle diameters less than 20 microns pass from the cyclone separators with the flue gases into Cottrell separators as will be described further. The larger particles are dropped back into the dense phase and thence on regeneration flow into the reactor as will be described further.

The invention will be further described by reference to the drawing in which

Fig. 1 is a diagrammatic flow sheet showing the flow of catalyst between the reactor and regenerator and the injection of steam between separation stages in the regenerator;

Fig. 2 is an illustration of the present invention showing the injection of steam where 3 separation stages are employed; and Fig. 3 illustrates the present invention in which a heat exchanger is interposed between two separation stages.

Referring now to the drawing in which similar numerals will be employed to identify similar parts and particularly to Fig. 1, numeral 11 designates a reactor vessel and numeral 12 a regenerator vessel. Line 13 conveys regenerated catalyst from vessel 12 into line 14 and thence into reactor 11. The regenerated catalyst is admixed with feed introduced into line 14 by line 15 from a source not shown. The feed stock may be any one of the numerous feed stocks that are now charged to catalytic cracking units and may be a residual oil or may be a gas oil or a naphtha. For the purpose of this description it is assumed that the feed stock is a gas oil and is admixed with the regenerated catalyst from line 13 which is at a temperature in the range from 800° to 1200° F. In reactor vessel 11 which is of sufficient size and capacity the cracking reaction is allowed to take place under conditions of flow such that a dense phase of catalyst in the vaporized feed is maintained. This dense phase is indicated generally by the numeral 16 and above it is a disperse phase which is indicated generally by the numeral 17.

Arranged in the upper portion of the reactor vessel 11 is a separator or separators, such as Buell cyclone 18, which is provided with dip leg 19 for return of catalyst to the dense phase 16. Leading from reactor vessel 11 and separator 18 is line 20 which discharges any finely divided catalyst escaping cylone 18 along with the cracked product into a fractionation zone for recovery of desired cracked products. The fractionation zone is not shown since the description thereof is not required for the purposes of this invention.

Spent catalyst from the dense phase 16 is withdrawn by line 21 and is admixed with air introduced by line 22 and thence introduced by line 23 into regeneration 12 whereby in a combustion operation takes place in the dense phase indicated generally by 24 in the lower portion thereof.

Above the dense phase in regenerator vessel 12 is a disperse phase 25 in the upper part of the vessel, the flow conditions being such to maintain the disperse phase above the dense phase.

In the upper part of the vessel 12 in the disperse phase 25 are located separation stages 26 and 27 connected in series by a conduit or line 28. These separators may be illustrated by the Buell cyclone well known to the art. Separator 26 is provided with a dip leg 29 which returns separated catalyst to the dense phase 24 and separator 27 is provided with a dip leg 30 which returns separated catalyst also to dense phase 24.

Separator 27 is connected to an outlet line 31 which discharges regeneration gases containing catalyst fines to a Cottrell precipitator, not shown. The stream in line 31 is a suspension of catalyst fines in flue gas.

The afterburning problem which has been encountered has occurred in the separation stages and particularly downstream from the separation stage 26. Therefore, in accordance with the present invention, a cooling fluid, such as steam, is introduced into line 28 by line 32. This steam may be at a temperature ranging from 250° to 350° F., which is substantially below the temperature, which may range from 800° to 1200° F., in the regeneration vessel 12 by virtue of the combustion operation therein which the carbon and carbonaceous bodies are removed from the catalyst.

Referring now to Fig. 2 a regenerator vessel 12 in which a dense phase 24 and a dispersed phase 25 is obtained as a result of proper maintenance of flow conditions has arranged therein a plurality of separation stages 40, 41, and 42 which are similar to separation stages 26 and 27 and may be Buell cyclones. Separation stage 40 is provided with a dip leg 43 for returning catalyst to the dense phase 24. Separator 41 is provided with a dip leg 44 also for returning the catalyst to the dense phase 24 while separator 42 is provided with a dip leg 45 also for returning catalyst to dense phase 24. Separation stage 40 is connected to separation stage 41 by a conduit 46 and separation stage 41 is connected to separation stage 42 by a conduit 47. Separation stage 42 is connected by line 31 to a Cottrell precipitator, not shown, wherein catalyst fines are recovered from the regeneration gases. Connecting into line 46 is line 48, which allows a cooling fluid, such as steam, to be introduced between separation stages 40 and 41. A similar line 49 allows steam to be introduced into line 47 between separation stages 41 and 42.

Referring now to Fig. 3 a regenerator vessel 12, as has been described with respect to Figs. 1 and 2, has arranged therein separation stages 26 and 27. It will be noted that regenerator 12 is operated under conditions to provide a dense phase 24 and a disperse phase 25. Interposed between separation stages 26 and 27 is a heat exchanger or cooling means 60 which is connected to separation stage 26 by conduit 61 and to separation stage 27 by a conduit 62. Arranged in heat exchanger 60 is a cooling coil 63. Connected to cooling coil 63 is line 64 by way of which a cooling fluid is introduced into the cooling means 60. Line 65 is provided to withdraw the cooling fluid from heat exchanger 60 and allow circulation through the cooling coil 63. By virtue of the heat exchanger 60 provided with a cooling coil 63 interposed between the separation stages 26 and 27, it is possible to cool the combustible regeneration gases and the solids contained therein as the suspension passes from separation stage 26 to separation stage 27. By virtue of this cooling operation afterburning is effectively prevented.

The cooling fluid introduced into the heat exchanger 60 may be the feed stock itself for economy of heat utilization or it may be cooling water or even a suitable refrigerant, such as liquefied petroleum gases, ammonia and the like. Since the purpose of the cooling fluid is to reduce the temperature of the suspension, including combustible gases and solids to prevent afterburning downstream from and in the separation stages after reducing the content of solids in the suspension, any suitable cooling fluid may be used provided the temperature of the cooling fluid is such to reduce the temperature of the combustible regeneration gases by an amount in the range from 50° to 150° F. depending on the level at which regeneration is conducted.

Thus, in accordance with the present invention, afterburning of the combustible regeneration gases is prevented by introducing steam either through line 32 with respect to Fig. 1 to prevent afterburning downstream from the separation stages or through lines 48 and 49 with respect to Fig. 2 for the same purpose. As pointed out before, the same effect can be obtained by direct cooling between stages by providing suitable heat exchange equipment as shown in Fig. 3.

In order to illustrate the invention further, effective prevention of afterburning was obtained in a catalytic cracking unit in which a regeneration temperature of 1135° F. was employed. This afterburning was prevented by using 14,500 pounds per hour of cooling steam between the separation stages. This was sufficient to cool the flue gas to 1060° F. In subsequent operations it was established that afterburning did not occur in the disperse phase at temperatures as high as 1150° F. provided the substantially catalyst-free flue gas downstream of the first stage was cooled to a temperature of 1060° F. The concentration of catalyst entrained in the flue gas to the primary cyclones or separation zones at this unit during the above operations was about 0.2 pound per cubic foot. The concentration of catalyst at the outlet of the first stage was approximately 0.04 pound per cubic foot.

By virtue of cooling between stages it was possible in this commercial operation to increase the fresh feed rate to the equivalent of reactor vessel 11 by approximately 2400 barrels per day. In addition, the increased burning rate possible by employment of higher regenerator temperatures than ordinarily practicable without cooling between stages has resulted in a reduction in the carbon in the regenerated catalyst from about 1.0% to 0.6%.

In other operations a regenerator temperature of 1125° F. was employed successfully without afterburning of the regenerator gases. The temperature in the flue gas line, equivalent to line 31, has been maintained at 1060° F. with no indication of afterburning at regenerator temperatures up to 1140° F. In these operations the concentration of catalyst in the flue gas entering the first cyclone was approximately 1.0 pound per cubic foot.

Experience in commercial units has demonstrated that afterburning will not occur when the present invention is employed at regenerator temperatures as high as 1150° F. at a catalyst concentration of flue gas of 0.2 pound per cubic feet. It is contemplated that a temperature of 1200° F. may be employed without afterburning by virtue of the benefits allowed in accordance with the present invention.

The nature and objects of the present invention having been completely described and illustrated, what I wish to claim as new and useful and to secure by Letters Patent is:

1. A method for regenerating finely divided catalytic solids containing carbon and carbonaceous bodies which comprises suspending said finely divided solids in a free oxygen-containing gaseous stream, burning carbon and carbonaceous bodies from said finely divided solids in a regeneration zone at a temperature in the range from 800° to 1200° F. to form a suspension of said solids in a combustible regeneration gas, reducing the solids content of said suspension in a first separation stage in said regeneration zone, flowing said suspension of reduced solids content into a second separation stage in said regeneration zone to reduce further the solids content of the suspension, introducing an inert cooling fluid into said suspension of reduced solids content flowing between said stages to lower the temperature of the suspension of reduced solids content flowing into the second stage by 50° to 150° F. to prevent afterburning in said suspension of reduced solids content downstream from said first stage while maintaining the temperature of the catalytic solids in said regeneration zone in the range between 800° and 1200° F., and then discharging a substantially solids-free gas from said second stage and said regeneration zone.

2. A method in accordance with claim 1 in which the cooling fluid is steam.

3. A method in accordance with claim 1 in which the cooling fluid is flue gas.

4. A method in accordance with claim 1 in which the cooling fluid is water.

5. A method in accordance with claim 1 in which the cooling fluid is steam at a temperature in the range from 250° to 350° F.

References Cited in the file of this patent

UNITED STATES PATENTS

| | | |
|---|---|---|
| 2,374,660 | Belchetz | May 1, 1945 |
| 2,393,839 | Thomas et al. | Jan. 29, 1946 |
| 2,419,245 | Arveson | Apr. 22, 1947 |
| 2,454,466 | Le Roi | Nov. 23, 1948 |
| 2,488,029 | Scheineman | Nov. 15, 1949 |
| 2,495,786 | Strader | Jan. 31, 1950 |
| 2,534,778 | Kuhn | Dec. 19, 1950 |
| 2,545,162 | Muly et al. | Mar. 13, 1951 |
| 2,580,827 | Payne | Jan. 1, 1952 |